D. DELLWO.
DRAFT EQUALIZER.
APPLICATION FILED APR. 13, 1908.
937,426.
Patented Oct. 19, 1909.
2 SHEETS—SHEET 2.
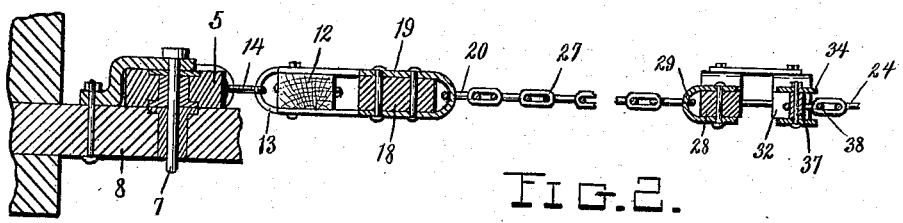
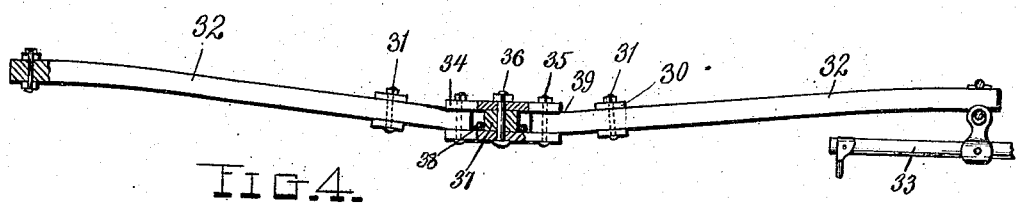
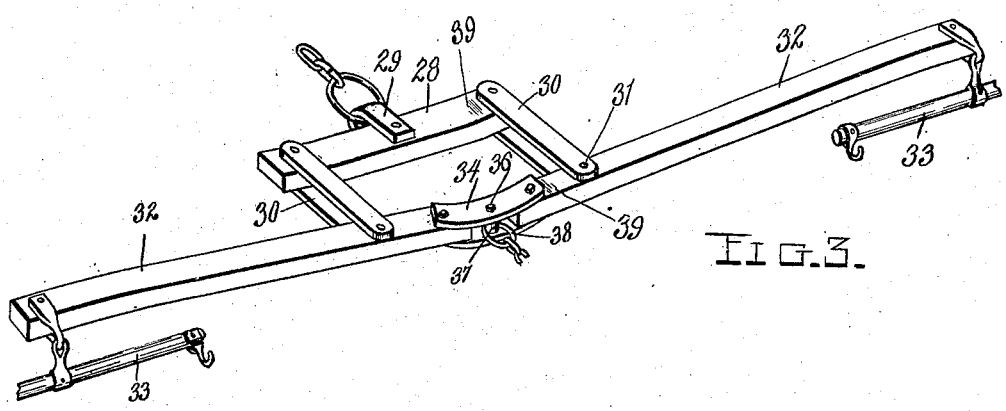
Witnesses
Chas. T. Jennings
L. O. Little
Inventor
Dennis Dellwo
By Watson E. Coleman
Attorney

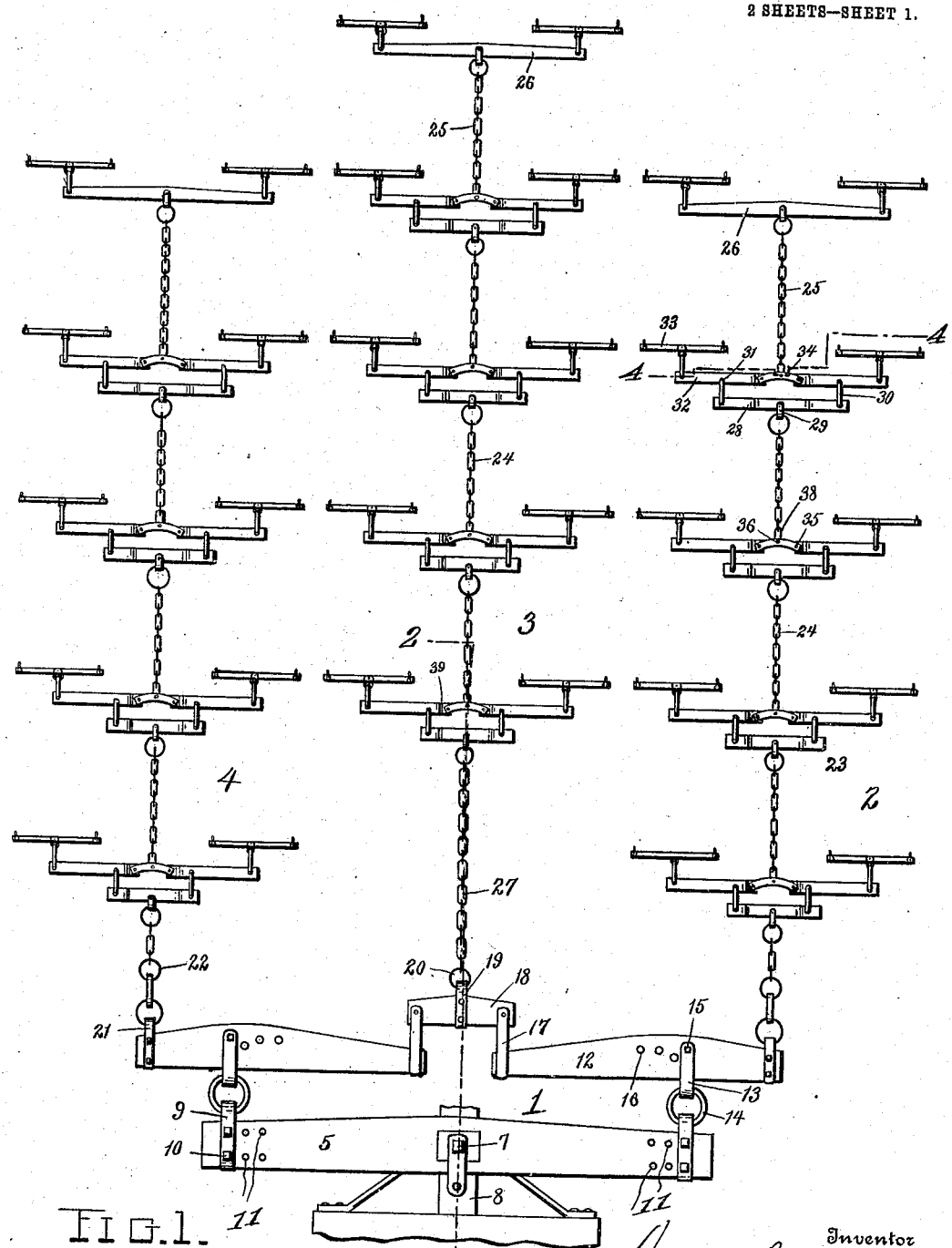

UNITED STATES PATENT OFFICE.

DENNIS DELLWO, OF PENDLETON, OREGON.

DRAFT-EQUALIZER.

937,426. Specification of Letters Patent. Patented Oct. 19, 1909.

Application filed April 13, 1908. Serial No. 426,801.

*To all whom it may concern:*

Be it known that I, DENNIS DELLWO, a citizen of the United States, residing at Pendleton, in the county of Umatilla and State of Oregon, have invented certain new and useful Improvements in Draft-Equalizers, of which the following is a specification, reference being had to the accompanying drawings.

My invention relates to improvements in draft equalizers and consists of the novel features of construction and the combination and arrangement of parts hereinafter described and claimed.

The object of the invention is to provide a device of this character which will be simple, strong, durable and comparatively inexpensive in construction and which will effectively equalize the draft upon a large number of animals.

The above and other objects of the invention are attained in its preferred embodiment illustrated in the drawings in which—

Figure 1 is a top plan view of my improved draft equalizer, the same being adapted for equalizing the draft upon thirty animals; Fig. 2 is a vertical longitudinal section taken on the plane indicated by the line 2—2 in Fig. 1; Fig. 3 is a perspective view of one of the team connections; and Fig. 4 is a detail sectional view, on an enlarged scale, its plane being indicated by the line 4—4 in Fig. 1.

The embodiment of my invention illustrated in the drawings comprises a main equalizing device 1 adapted to equalize the draft upon three similar secondary equalizing devices 2, 3, 4, each of which latter are in turn adapted to equalize the draft upon a double row or file of animals.

The device 1 comprises a main lever 5 preferably in the form of a large wooden beam provided at its center with an aperture for a draw pin 7 which pivots it upon the tongue 8 of a machine, vehicle or the like. Upon the ends of the primary lever 5 are longitudinally adjustable clevises 9 in the form of U-shaped straps which are made adjustable by passing bolts 10 through them and through pairs of apertures 11 formed in the ends of said lever. The device 1 also comprises two secondary levers 12 which are provided intermediate their ends with longitudinally adjustable clevises 13 that are connected by rings 14 to the clevises 9. The clevises 13 are similar to the latter and are adjusted by passing bolts 15 through their ends and through apertures 16 formed in the levers 12 in a longitudinally extending row or series as clearly shown in Fig. 1. The long inner ends or arms of the levers 12 are connected by pairs of strap links 17 to the ends of a connecting lever 18, which latter carries at its center a fixed U-shaped clevis 19 containing a ring 20. The short outer ends of the levers 12 have fixed upon them U-shaped clevises 21 containing rings which are connected by links, chains or other flexible connections to rings 22.

The secondary draft devices 2, 3, 4 are identical in construction and each consists of a series of team connections 23 arranged in file formation and connected by chains 24, the foremost one being connected by a chain 25 to a double tree 26 and the rearmost one being connected by a chain 27 to one of the rings 20, 22. Each of the team connections 23 consists of a primary lever 28 provided at its center with a pivoted U-shaped clevis 29 containing a ring to which one of the chains 24 is connected. The ends of the lever 28 are connected by pairs of strap links 30 to pivot or fulcrum bolts 31 arranged in secondary levers 32 at suitable points intermediate their ends. The levers 32 have connected to their outer ends swingle trees 33 and their inner ends are connected together by means of coupling levers or plates 34. The latter are bowed or curved forwardly and longitudinally and arranged in pairs, one being above and the other below the levers 32 and being pivotally connected to them by bolts or pins 35. The levers or plates 34 are rigidly connected together by a vertical bolt 36 passed centrally through them and they are spaced apart so that the inner ends of the levers 32 have a sufficient play between them, by a cylindrical sleeve 37 which surrounds the bolt 36. Arranged upon the sleeve 37 is a ring or link 38 to which the rear end of one of the chains 24 is connected, said sleeve being disposed forward of the central longitudinal line of the levers 32 by the bowed or curved formation of the plates 34, thus holding the ring 38 a sufficient distance forward to prevent interference between the same and the inner ends of said levers 32. The ring 38 of the foremost team connection 23 has the chain 25 connected to it.

In order to prevent the inner ends of the swingle trees 33 from catching upon the levers or plates 34 or other portions of the device, the outer ends of the levers 28 and the inner ends of the levers 32 are laterally offset as shown at 39 so that said swingle trees will be disposed in a plane above that of the remaining portions of the team connections as will be readily understood upon reference to Figs. 3 and 4 of the drawings.

It will be noted upon reference to Fig. 1 that the pivots or fulcrums 31 for the secondary levers 32 of the team connections 23 are arranged at varying distances from the inner ends of said levers and that such distances vary with respect to the positions of the team connections in the file formation, in order that the draft will be equally distributed upon all of the animals in each of the devices 2, 3, 4.

The operation and advantages of the invention will be readily understood upon reference to Fig. 1 in which the equalizer is adapted for thirty horses arranged in three double strings or rows of ten each. It will be understood, however, that a greater or less number of horses may be arranged in the different strings or rows, in which case the fulcrums for the levers 12 are properly disposed to equalize the draft on the several strings. A greater or less number of the team connections 23 may be arranged in each of the strings and the chains 24, 25 may be varied in length to accommodate long or short animals. When an equal number of animals are arranged in each of the strings the center string has its leaders slightly in advance of those of the outer strings by reason of the use of a longer chain 27 for said central string; but when a greater number of animals are used in the central string the rearmost team connection of the same may be attached directly to the ring 20.

It will be noted that the embodiment of the invention shown in Fig. 1 is especially designed for use upon harvesters and other large machines, and that it is light, strong and durable in construction and gives the driver better control of the team because each double row or string of horses works on a separate chain which keeps every horse in place. It has an advantage over other equalizing devices where lead bars are used, since a lead bar is not a perfect equalizer, the slow horse having the advantage over the fast one and if one horse shirks, the horse at the other end of the lead bar has the lazy horse's load as well as his own to carry, while in the present invention every horse is on an equalizer with the rest of the horses in the string or row.

It will be understood that any of the devices 2, 3, 4 may be used independent of the others and the device 1; and that they are especially adapted for use in connection with plows, heavy wagons, or the like.

Having thus described my invention what I claim is:

A draft equalizer comprising a series of team connections arranged in file formation and each comprising a primary lever, a pair of secondary levers arranged in advance of the primary one and provided intermediate their ends with fulcrums, said primary and secondary levers having offset portions inclining their outer ends upwardly above the plane of their inner portions, pairs of superposed link plates connecting said fulcrums to the ends of the primary lever, a pair of superposed arcuate coupling plates pivotally connecting the inner ends of the secondary levers, said coupling plates being forwardly and longitudinally bowed or curved so as to offset their intermediate portions in advance of the central longitudinal line of secondary levers, a bolt connecting the said forwardly offset intermediate portions of the coupling plates between and spaced from the inner ends of the secondary levers, said bolt being arranged in advance of the said fulcrums of the latter, a spacing sleeve inclosing said bolt between the coupling plates, a ring engaging said sleeve, a U-shaped clevis centrally arranged upon each of the primary levers of the team connections, a chain connecting the clevis of the primary lever of one team connection with the ring of the next adjacent team connection, and a doubletree connected to the ring of the foremost team connection.

In testimony whereof I hereunto affix my signature in the presence of two witnesses.

DENNIS DELLWO.

Witnesses:
J. P. WINTER,
S. A. LOURIE.